US009992633B2

United States Patent
Geng et al.

(10) Patent No.: US 9,992,633 B2
(45) Date of Patent: *Jun. 5, 2018

(54) BLUETOOTH LOW ENERGY LOCATION SYSTEM AND METHOD

(71) Applicant: Awarepoint Corporation, San Diego, CA (US)

(72) Inventors: Wei Geng, San Diego, CA (US); Dipal Kashipara, San Diego, CA (US); John Taylor, San Diego, CA (US); Gary Jorgensen, San Diego, CA (US)

(73) Assignee: AWAREPOINT CORPORATION, San Diego, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/696,124

(22) Filed: Sep. 5, 2017

(65) Prior Publication Data
US 2017/0366944 A1   Dec. 21, 2017

Related U.S. Application Data

(63) Continuation of application No. 14/679,501, filed on Apr. 6, 2015, now Pat. No. 9,788,167.

(51) Int. Cl.
H04W 4/04        (2009.01)
H04W 4/00        (2018.01)

(52) U.S. Cl.
CPC ........... *H04W 4/043* (2013.01); *H04W 4/008* (2013.01)

(58) Field of Classification Search
CPC ....... H04W 4/02; H04W 4/043; H04W 4/008; H04W 64/00

USPC ..... 455/41.1–41.2, 404.2, 414.1–414.2, 421, 455/456.1–457; 340/539.13
See application file for complete search history.

(56) References Cited

U.S. PATENT DOCUMENTS

| 2003/0232598 | A1 | 12/2003 | Aljadeff et al. | |
|---|---|---|---|---|
| 2008/0045234 | A1* | 2/2008 | Reed | H04W 8/02 455/456.1 |
| 2010/0291947 | A1* | 11/2010 | Annamalai | G01S 5/0263 455/456.1 |
| 2011/0081918 | A1 | 4/2011 | Burdo et al. | |
| 2011/0301912 | A1* | 12/2011 | Pandey | G01S 5/02 702/150 |
| 2012/0083289 | A1* | 4/2012 | Li | H04W 64/00 455/456.1 |

(Continued)

*Primary Examiner* — Michael Mapa
(74) *Attorney, Agent, or Firm* — DLA Piper LLP (US)

(57) ABSTRACT

A BLE location system and method are disclosed. The BLE system may provide accurate location of a BLE enabled object in a three dimensional space. The three dimensional space may be a building and the BLE system and method permits accurate location at a room, bay, and bed level in the three dimensional space to be determined. In some embodiments, the BLE system may determine if a BLE enabled object crosses a boundary and the boundary may be, for example, a boundary to a room, such as a door, a boundary to a space, such as a hallway or meeting area, or a boundary to a particular location identified by set of coordinates (X,Y or X,Y,Z for example). The determination of the boundary crossing of the BLE enabled object or the location of the BLE enabled object may be used for staff and patient locating and their associated workflows as well as high accuracy asset tracking in a hospital embodiment.

20 Claims, 16 Drawing Sheets

(56) References Cited

U.S. PATENT DOCUMENTS

| | | |
|---|---|---|
| 2012/0115512 A1 | 5/2012 | Grainger et al. |
| 2013/0072216 A1 | 3/2013 | Ledlie |
| 2013/0225209 A1* | 8/2013 | Chen .................. G01S 5/0252 455/456.6 |
| 2014/0148196 A1 | 5/2014 | Bassan-Eskenazi et al. |
| 2014/0162696 A1* | 6/2014 | Tysowski ................. G01S 5/00 455/456.3 |
| 2014/0195256 A1 | 7/2014 | Wagner et al. |
| 2014/0228044 A1* | 8/2014 | Jones, Jr. ............. G01S 5/0226 455/456.1 |
| 2014/0237076 A1 | 8/2014 | Goldman et al. |
| 2014/0274150 A1 | 9/2014 | Marti et al. |
| 2014/0361928 A1 | 12/2014 | Hughes et al. |
| 2015/0071274 A1 | 3/2015 | Sugar et al. |
| 2015/0151051 A1 | 6/2015 | Tsoukalis |
| 2015/0373482 A1 | 12/2015 | Barnard |

\* cited by examiner

BLUETOOTH LOW ENERGY LOCATION SYSTEM AND METHOD

PRIORITY CLAIMS/RELATED APPLICATIONS

This application claims priority under 35 USC 120 and is a continuation of U.S. patent application Ser. No. 14/679,501, filed Apr. 6, 2015 and entitled "BLUETOOTH LOW ENERGY LOCATION SYSTEM AND METHOD", the entirety of which is incorporated herein by reference.

FIELD

The disclosure relates generally to a system and method for performing location determination using the BlueTooth Low Energy protocol.

BACKGROUND

BlueTooth Low Energy (aka BLE) is a low energy variant of the BlueTooth short range wireless standard that was introduced as part of the BlueTooth 4.0 specification. Further details about BLE and the Bluetooth 4.0 specification may be found at https://www.bluetooth.org/en-us/specification/adopted-specifications and https://developer.bluetooth.org/TechnologyOverview/Pages/BLE.aspx which are incorporated herein by reference. The purpose of BLE is to provide an extremely low power wireless system similar in power consumption to Zigbee. Zigbee is an older wireless low power communication standard.

Shortly after the introduction of BLE chipsets, Apple® introduced a product called iBeacon along with a simple protocol specification, all based on BLE. Further details of the iBeacon product and its protocol specification may be found at https://developer.apple.com/ibeacon/ which is incorporated herein by reference. iBeacon provides a BLE beacon (transmit only) that devices (e.g. cell phones) may receive and use to determine a rough location. The location technology is simple proximity based on the RSSI (received signal strength indication) of the beacon as seen by the receiving device.

Due to the significant impact of a complex indoor environment to the radio frequency (RF) signal propagation path such as obstruction, multiple-path, fading etc., the received signal strength (RSSI) is highly volatile and only loosely correlated to the distance between the transmitter and the receiver. Therefore, the location technology must create methods to detect and minimize the noises, and combine with additional information to intelligently determine the location of an object in the complex indoor environment.

The usage of the BLE system can vary from simple Way Finding application to more complicated enterprise wide asset tracking, to tracking critical patient/staff workflow process. Each of these applications could have different BLE deployment scheme and combination of the schemes. In addition, depending on the applications, the ideal location engine processing needs to be on an end device such as a smartphone or a tag, or can be on a cauterized place such as an appliance or in the cloud. The architecture flexible and variety require the location technology to be dynamic and flexible enough to accommodate all the usage scenarios.

DETAILED DESCRIPTION OF ONE OR MORE EMBODIMENTS

Figure 1:
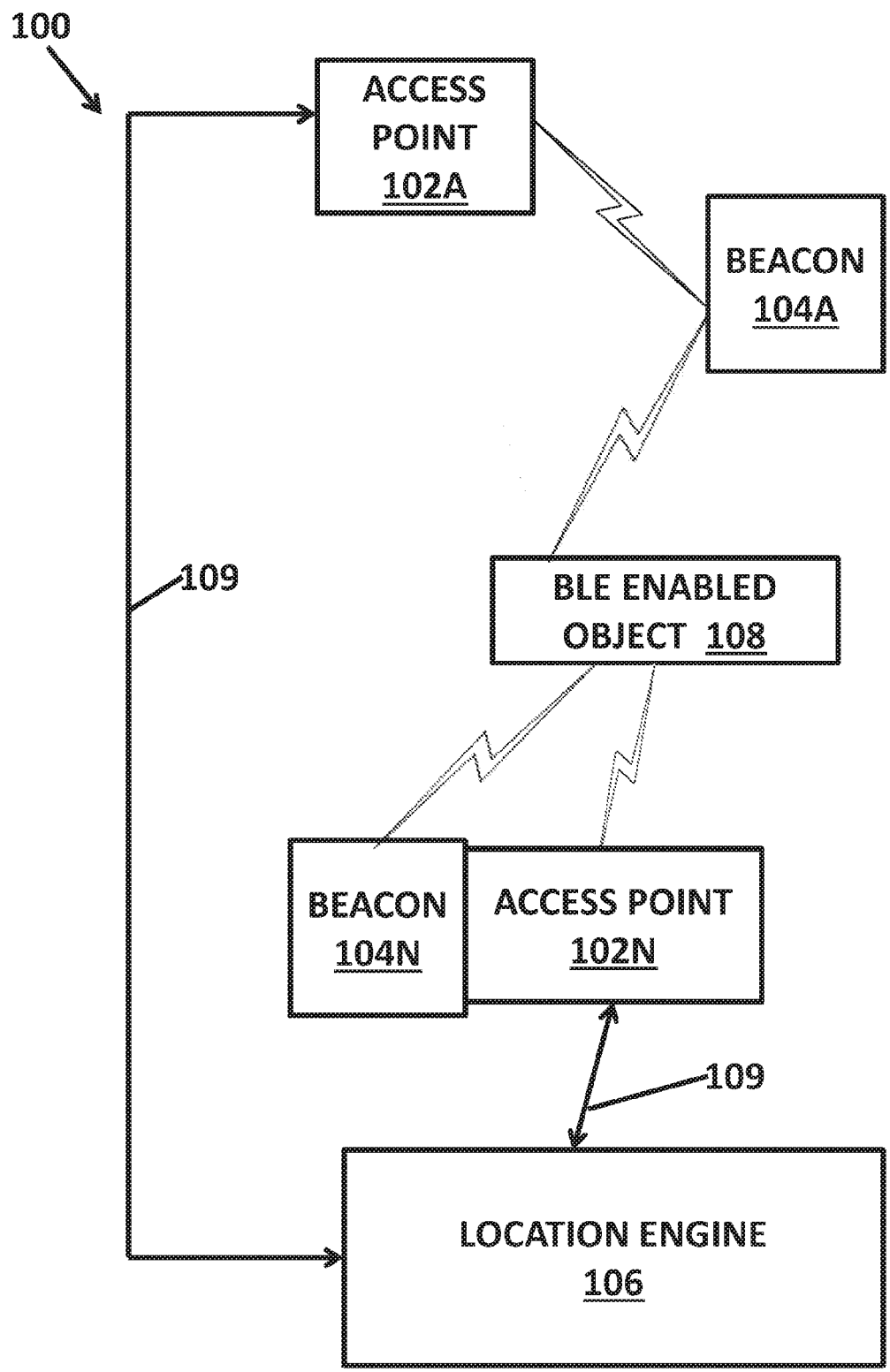
FIG. 1 illustrates an example of a BLE based real time location system.

The disclosure is particularly applicable to a BLE based location system and method and it is in this context that the disclosure will be described. It should be appreciated that the BLE system and method may be used as a standalone system as shown in the diagrams below or it may be combined with various known real time location system (RTLS) that may use different technologies. The BLE system may provide accurate location of a BLE enabled object in a three dimensional space. The three dimensional space may be a building and the BLE system and method permits accurate location at a room, bay, and bed level in the three dimensional space to be determined. In some embodiments, the BLE system may determine if a BLE enabled object crosses a boundary and the boundary may be, for example, a boundary to a room, such as a door, a boundary to a space, such as a hallway or meeting area, or a boundary to a particular location identified by set of coordinates (X,Y or X,Y,Z for example). The determination of the boundary crossing of the BLE enabled object or the location of the BLE enabled object may be used for staff and patient locating and their associated workflows as well as high accuracy asset tracking in a hospital embodiment.

The BLE enabled object described below may be any object (including a human being) that has a BLE receiver device (or has a BLE receiver associated with the human being) that is able to sense BLE messages. For example, each BLE enabled object may be a smartphone device with a BLE receiver (or an attached BLE receiver), a BLE tag, a medical device including various medical equipment with a BLE receiver (or an attached BLE receiver), other computing devices, such as laptop or tablet computers, that have a BLE receiver (or an attached BLE receiver), other communication devices, such as cellular phones, that have a BLE receiver (or an attached BLE receiver) and/or physical assets in the three dimensional space, such as a bed, medical personnel, such as a doctor or a nurse, etc. that have a BLE receiver (or an attached BLE receiver).

The BLE system and method may have an Input Stabilization process to stabilize and standardize different Awarepoint beacons (Omni, direction, and special purpose beacons) and iBeacon messages and a floor selection process to decide which floor the BLE enabled object is on in a multi-floor indoor building environment. The BLE system and method also may have set of core location processes targeted at different deployment and usage scenarios. These scenarios may include but are not limited to Way Finding, RTLS, Zone, and Fast Room Entry. The expansion of these methods to address other usage scenarios can be easily accomplished by adding to the core location modules. The system and method also may have an arbitration and switching module automatically decides which location result to output. The system and method may also have a context-aware location module that integrates the location inputs from various location technologies; utilizing context-aware information such as device/role, location, and application to minimize the location error and enhance the response time. It also creates a feedback channel for application specific inputs. In the system all modules are input driven and can also be plugged in and out without depending on the computation platform requirement. For example, the simple Way Finding smartphone app can deploy a portion of the algorithm. On the other hand, the entire algorithm stack can be deployed on the smartphone and only Way Finding algorithm is running if there are only Way Finding inputs.

In the system, the location engine may be on a remote computer system from the BLE enabled object and the BLE enabled object may communicate via Wi-Fi or other wireless technology with the location engine. Alternatively, the location engine (and its location method) may be resident on the BLE enabled object that has the memory and processing power to perform the location method. For example, if the BLE enabled object is a smartphone device, such as an Apple® iPhone® or Android® OS based device, the location engine may be executed by the processor of the BLE enabled object. Regardless of the location of the location engine, the location engine executes the location methods.

FIG. 1 illustrates an example of a real time location system 100 that may include the location engine with the location component. The system 100 has one or more wireless access points 102, such as AP 102A, . . . , 102N as shown in FIG. 1, that may be coupled over a network 109 to a location engine 106. In one embodiment, each wireless access point may communicate using a known Wi-Fi protocol, but the wireless access point may also use other wireless communication protocols. The system may also have one or more Bluetooth Low Energy (BLE) beacons 104, such as beacon 104A, . . . , 104N as shown in FIG. 1, and each BLE beacon may be at a fixed location in the three dimensional space and that location is known by the location engine 106. For example, the system may have at least one BLE beacon at each side of a boundary and then be able to perform a room entry determination based on the signals from the at least two BLE beacons. The BLE beacons 104 may include BLE beacons with directional antennas (at each boundary), BLE beacons with omnidirectional antennas and BLE beacons that transmit an Awareware Corporation protocol signal.

As shown in FIG. 1, some beacons 104N may be physically located adjacent an access point 102N. The system may also have one or more BLE enabled objects 108 whose accurate location and boundary crossing may be determined by location engine 106. Each BLE beacon 104 may periodically or continuously transmit a BLE messages that may be sensed by a BLE enabled object 108. The BLE enabled object 108 may generate one or more characteristics of the one or more BLE beacon signal(s) and then communicate the one or more characteristics of the BLE beacon signal(s) to the location engine 106 over the network 109 using the AP 102N. The location engine may generate a determination, based on the one or more characteristics of the BLE beacon signal(s), of the location of the BLE enabled object that received the BLE beacon signals.

Figure 2:
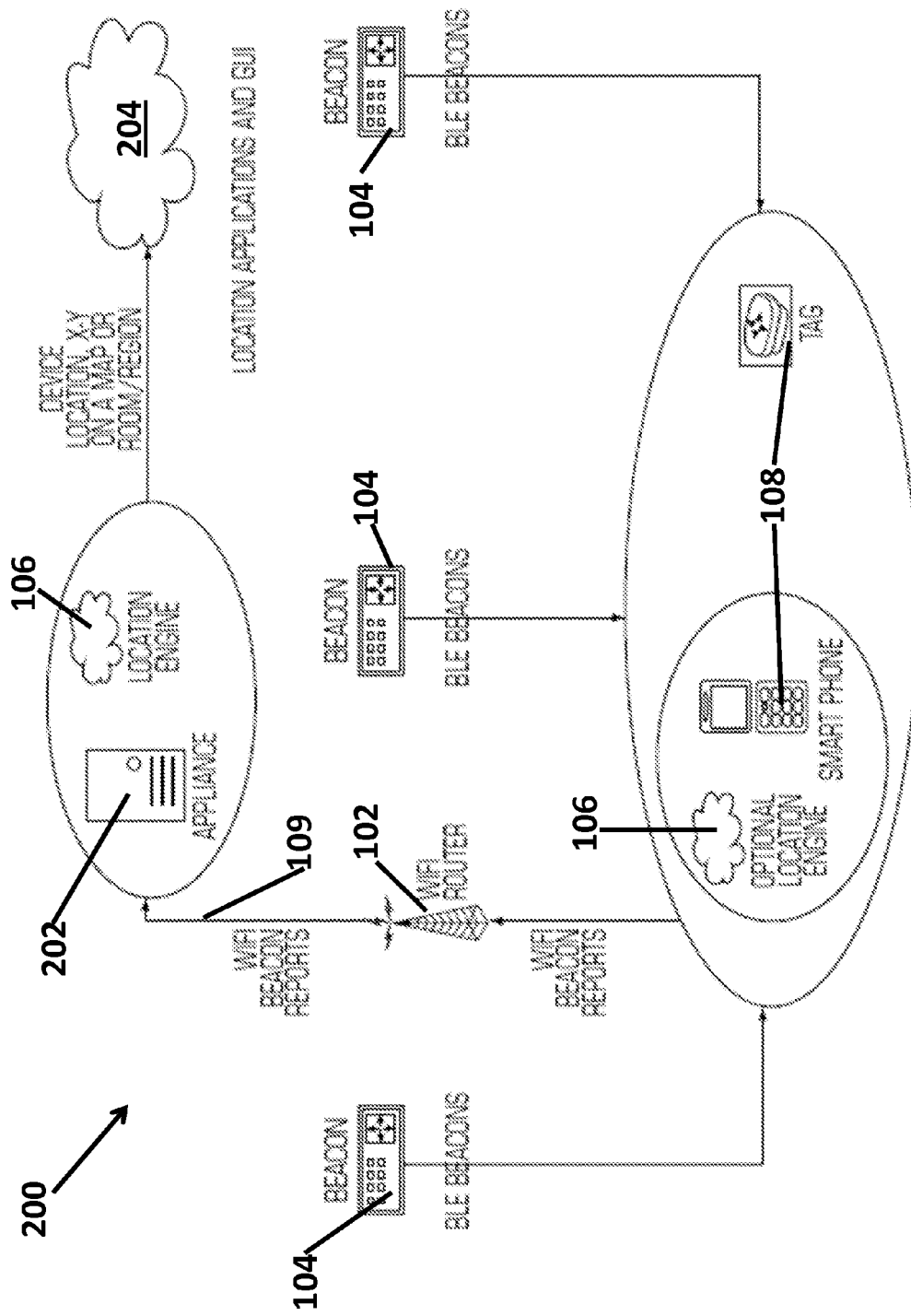
FIG. 2 illustrates another example of an implementation of a BLE based real time location system.

FIG. 2 illustrates another example of an implementation of a real time location system 200 that may include the location engine implementing the location method. As with the implementation shown in FIG. 1, the system has the one or more BLE beacons 104, one or more BLE enabled objects 108 (shown as a smartphone and a BLE tag) and the network 109 that has one or more access points 102. In this implementation as shown in FIG. 2, the location engine 106 may be remotely located from some of the one or more BLE enabled objects 108 and may be resident on at least one of the BLE enabled objects 108. In this implementation, the remote location engine 108 may be resident and operating on a hardware appliance 202 that may also be coupled to the network 109 and able to communicate over that network. For example, the location engine on the hardware appliance may receive BLE beacon data reports from the one or more BLE enabled objects 108 over the network 109 that may be a Wi-Fi network or other network. The location engines 106 operate in a similar manner as described above in FIG. 1 and also as described in more detail below. In this implementation, the location engine 106 on the appliance 202 may communicate data about BLE enabled object location (or boundary crossing), coordinates of the one or more BLE enabled objects 108 on a map and/or a room/region of the one or more BLE enabled objects 108 in the three dimensional space to other locations applications and a graphical user interface 204.

In both of the implementations in FIGS. 1 and 2, the system 100, 200 may be installed in a three dimensional space. The three dimensional space may be a building (single floor or multiple floors) in which the occupant of the building wants to track BLE enabled objects within the three dimensional space. For example, the above described system may be used for a hospital, a manufacturing facility or other building in which it would be desirable to track BLE enabled objects within the building and determine boundary crossings or location of the BLE enabled objects within the building.

Figure 3A:
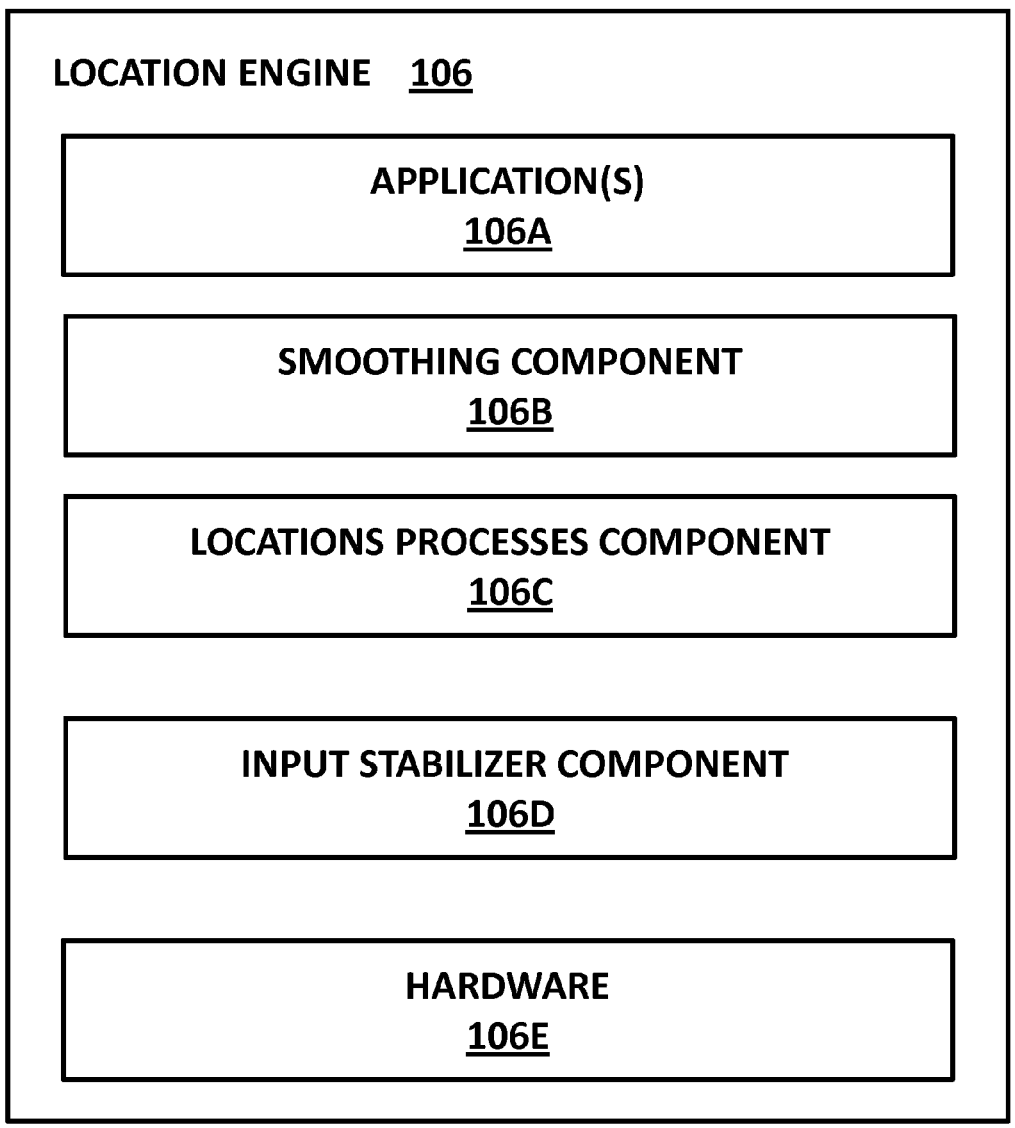
FIGS. 3A and 3B illustrate more details of the location engine that is part of the system shown in FIGS. 1-2.
Figure 3B:
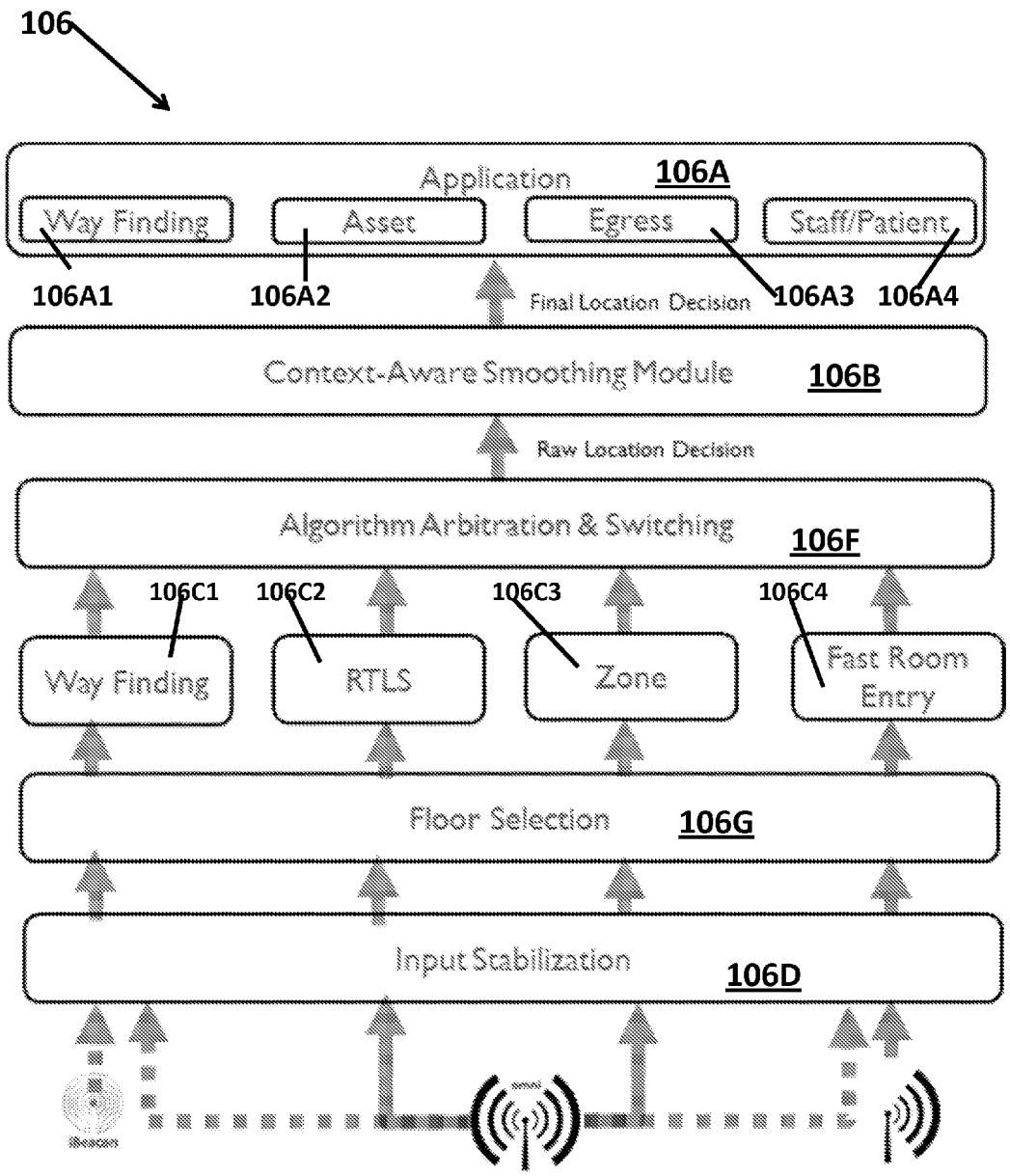

FIGS. 3A and 3B illustrate more details of the location engine 106 that is part of the system shown in FIGS. 1-2. The location engine may be part of a BLE enabled object that has sufficient processing power, etc. to perform the locations methods described below and/or the location engine 106 may be part of a hardware appliance that is remote from the BLE enabled objects. The location engine 106 and its components shown in FIGS. 3A and 3B may be implemented in software or in hardware. When the location engine 106 and its components shown in FIGS. 3A and 3B are implemented in software, the location engine may have a plurality of lines of computer code that may be stored in a memory and then executed by a processor(s) of the BLE enabled object or the appliance so that the processor is configured to perform the operations of the location engine and its components. When the location engine 106 and its components shown in FIGS. 3A and 3B are implemented in hardware, the location engine and its components may be a hardware device (such as an application specific integrated circuit, programmable logic device) that performs the operations of the location engine and its components. FIG. 3A illustrates an example of a software implemented location engine and components.

The location engine 106 may comprises one or more applications 106A, a smoothing component 106B, a locations process component 106C, an input stabilization component 106D and one or more hardware components 106E on which the other components may be executed. For example, the one or more hardware components 106E may include one or more processors, one or more memories, persistent storage, wireless communication circuits to be able to interact with each BLE enabled object. As shown in FIG. 3B, signals from the beacons that are received by a BLE enabled object may be fed by the BLE enabled object into the input stabilization 106D that stabilizes/smoothes the signals as described below. The smoothed signals may be fed into a floor selection component 106G that determines, based on the signals from the beacons received by the BLE enabled object, a floor of the building on which the BLE enabled object may be located.

The signals may then be fed into one or more different location methods, such as a way finding method 106C1, a RTLS method 106C2, a zone method 106C3, a fast room entry method 106C4 and a bed/bay location method. The location results from the different location methods may be fed into an arbitration and switching component 106F that selects the appropriate location result for the particular use. The output is a raw location decision that may be fed into the content-aware smoothing component 106B that uses various other data (described below) to reduce errors in the location result. The content-aware smoothing component 106B may output a final location decision that may be fed into one or more of the applications 106A that run on top of the location determination. As shown in FIG. 3B, the applications may include a way finder application 106A1 that allows a patient, family member or visitor to find their way around inside a building such as a hospital, an asset tracking application 106A2 that allows a staff at a hospital to track and find an asset, an egress application 106A3 that allows staff to detect an asset going out of a door or patent elopement and a staff/patient application 106A4 for ED/operating room (OR) workflow tracking or milestone auto-enter for staff and patients.

Figure 4:
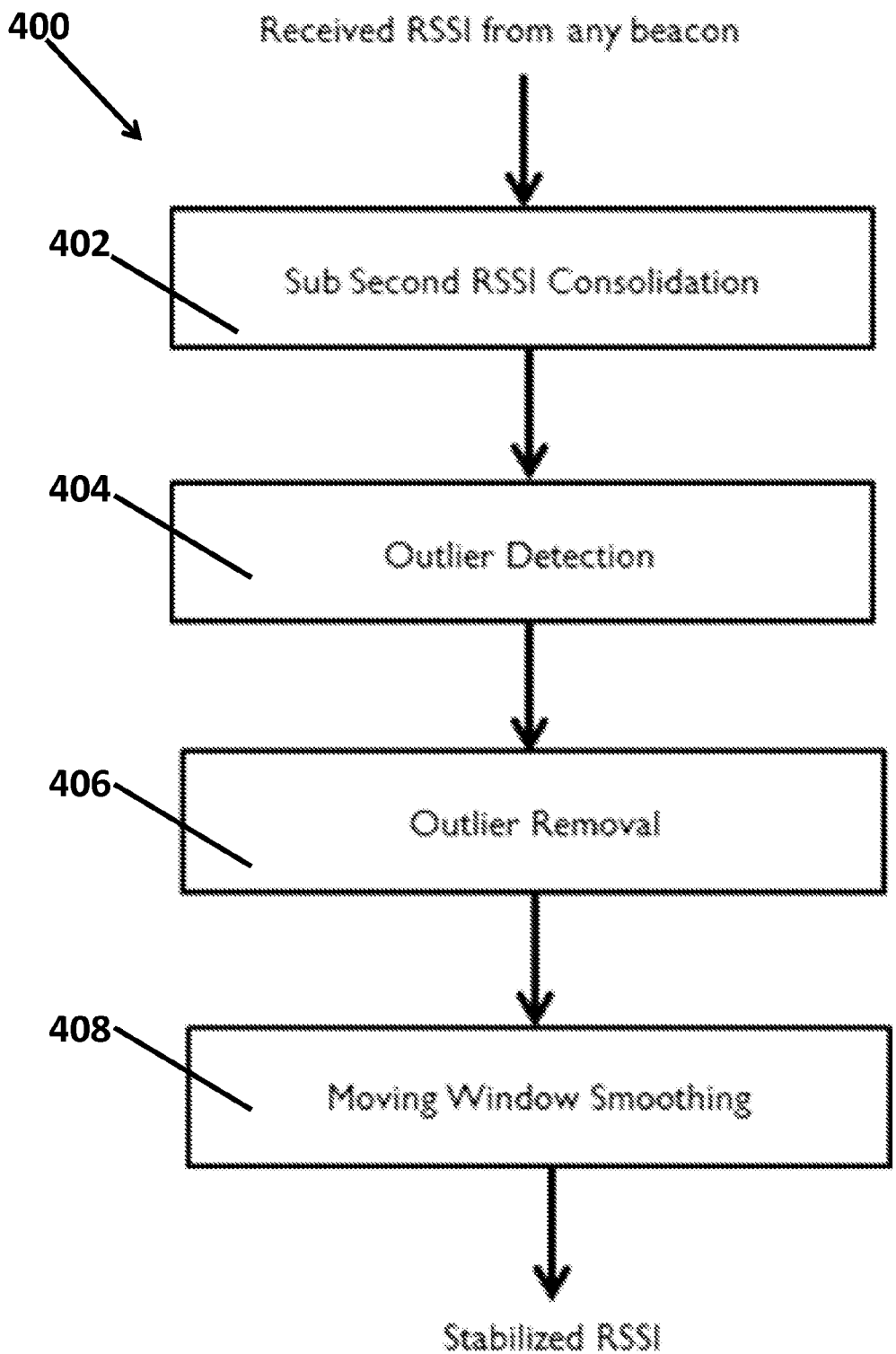
FIG. 4 illustrates an example of an RSSI stabilization method that may be executed by the location engine.
Figures 5A, 5B:
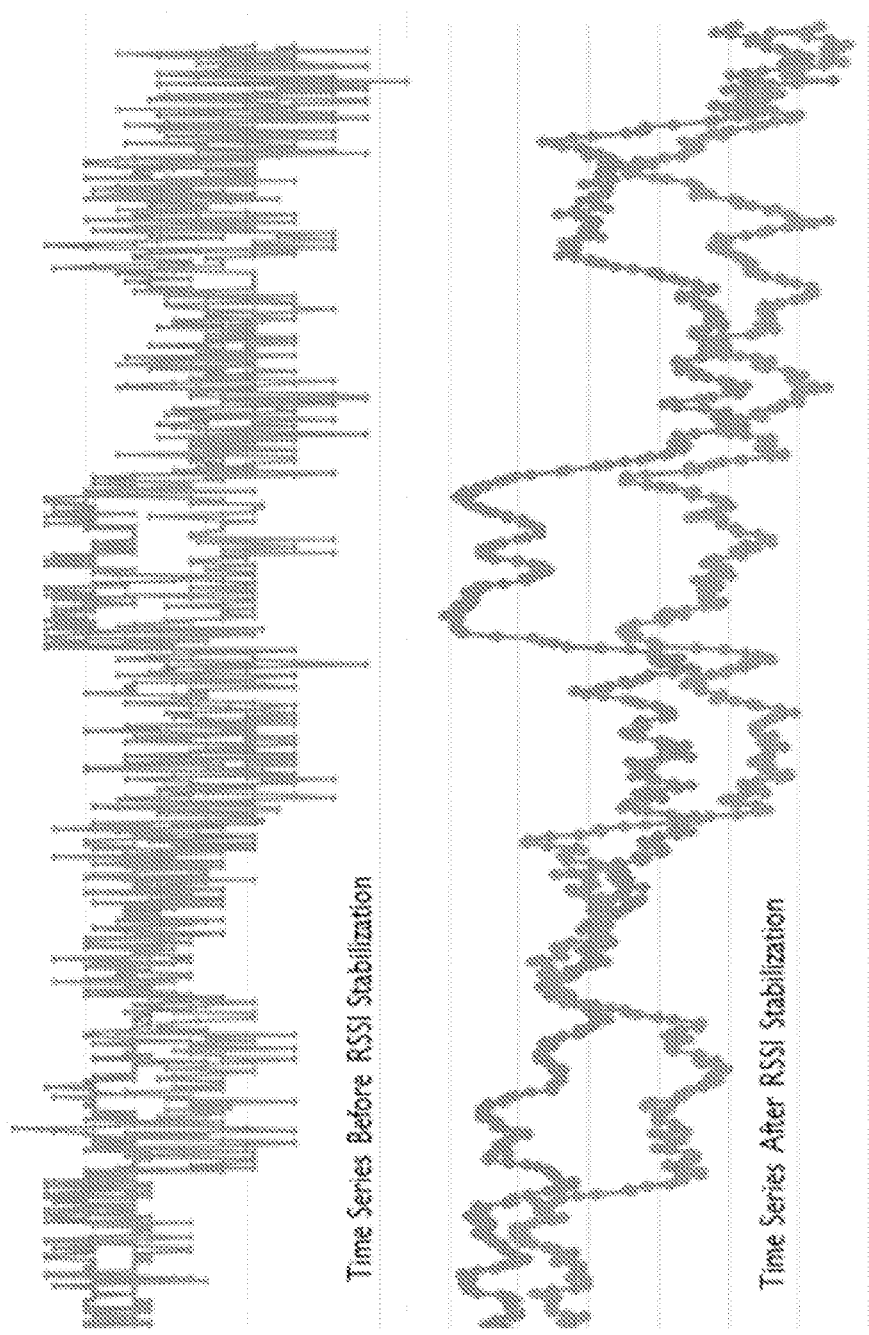
FIGS. 5A and 5B illustrate two signals before and after RSSI stabilization such as using the method in FIG. 4.

FIG. 4 illustrates an example of an RSSI stabilization method 400 that may be executed by the location engine and FIGS. 5A and 5B illustrate two signals before and after RSSI stabilization such as using the method in FIG. 4. The received BLE RSSI is highly volatile and must be stabilized/smoothed to be useful in the distance or association calculation. Thus, the process shown in FIG. 4 may be performed for each signal from the BLE enabled object for each beacon. The method may include a sub-second RSSI consolidation step (402) that has two purposes: 1) standardize fast (sub-1 s beacon rate) and slow (1 s beacon) beacons to the standard interval; 2) provide initial smoothing of fast beacons. An outlier detection process 404 may be used to detect any RSSI deemed to be outlier and the outlier(s) are removed from the calculation (406). The final smoothing is calculated on moving windows (408) to generate stabilized RSSI. There are many possible techniques that can be used in the moving window smoothing. These techniques include but are not limited to equal or non-equal weighted moving averages, median, maximal, minimal, or mode values. These smoothing techniques are also combined with outlier removal to achieve the optimal result. As shown in FIGS. 5A and 5B, an example of RSSI Stabilization (before and after on the received RSSI time series) are shown. Notice the RSSI showed in upper blue curve shows much clear separation after the stabilization.

Figure 6:
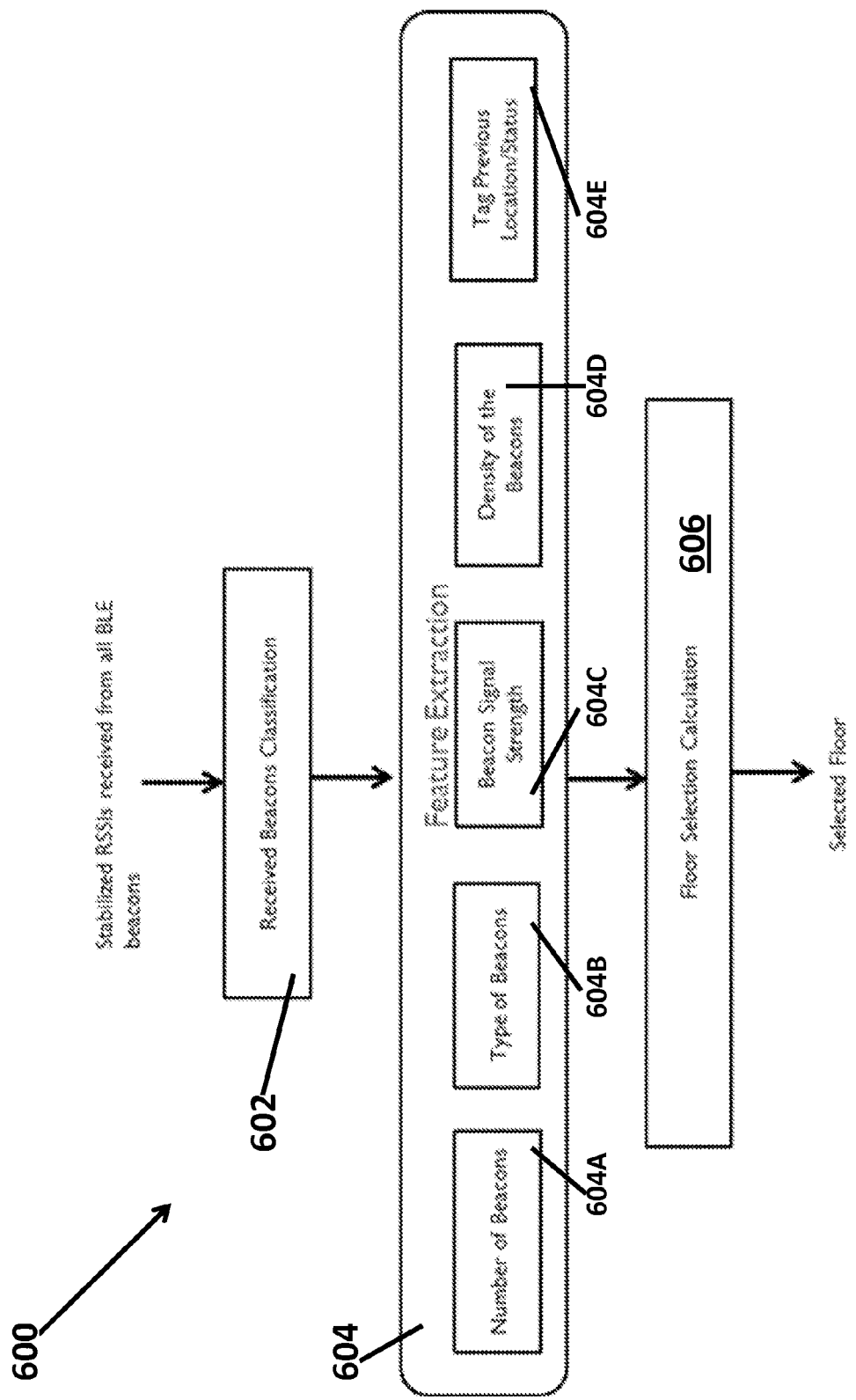
FIG. 6 illustrates an example of a floor selection process that may be executed by the location engine.
Figure 7:
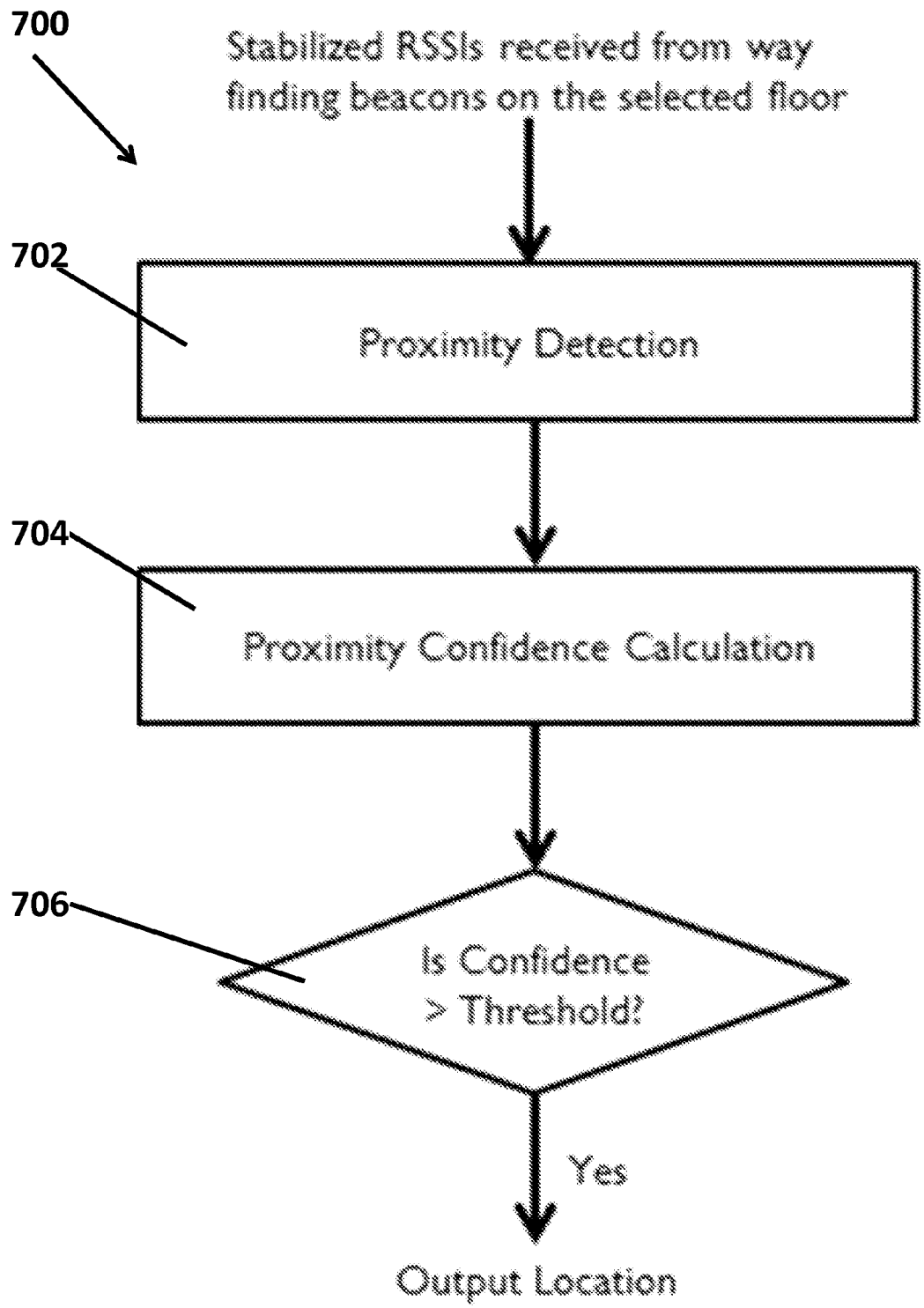
FIG. 7 illustrates an example of a way finding process that may be executed by the location engine.

FIG. 6 illustrates an example of a floor selection process 600 that may be executed by the location engine. As the BLE signals penetrates the ceiling and wall structures, the beacons from adjacent floors will be heard by the BLE enabled objects. In addition, the number of beacons heard from the adjacent floors might exceed the number from the current floor depending on the density of the beacons deployed on adjacent floors. Therefore, the correct selection of the floor is required to locate the BLE enabled object on the correct floor. In the floor determination method, the received beacon signals may be classified (602) based on what floor they are located on and what type of beacon (omni, directional, ibeacon, or Special purpose) based on the received signal. The method may then perform feature extraction (604) and the method attempts to determine the most likely floor the BLE enabled object is on based on the comparison of these features using variety of factors. These factors include but not limited to number of beacons heard on each floor (604A), the signal strength (604C) and type of the beacons heard (604B); the characteristic of the floor (e.g. density and geometry of the beacons and heard beacons); also the BLE enabled object type (asset, patient, staff), status (in-motion or out of motion) and previous locations (e.g. same or different floor, near or far from exit/elevator). Thus, the method then determines the floor selection for the particular BLE enabled object (606). For example, criteria 1 may select the floor with the highest average RSSI of the strongest 3 beacons heard; criteria 2 may select floor with the highest RSSI heard; criteria 3 may select the floor with the smallest area of the strongest 3 beacons covers and criteria 4 may indicate not changing floor when the tag is out of motion FIG. 7 illustrates an example of a way finding process 700 that may be executed by the location engine. The Way Finding method is designed to output location information to Way Finding application to navigate inside and outside a building. Note the location information does not include features such as orientation, destination recognition, route planning, decision, and monitoring etc. However, it does include techniques to avoid reporting past or wrong turn locations. In the method, a Proximity Detection (702) locates the closest Way Finding Beacon among all the beacons. To avoid the errors introduced by noise or missed beacon etc, a proximity confidence level is calculated (704). The proximity confidence level may be calculated based on factors such as the differentials of strongest RSSI with relate to remain RSSI, number of RSSI received vs. anticipated, the geometry or distribution of the received RSSIs etc. If there is enough confidence (706), a Way Finding location is output. Otherwise, the location is not passed onto next step. This is to minimize any location errors such as false wrong turn, or hopping to nearby/previous locations. For example, if the strongest 2 beacon RSSIs are less than a threshold (e.g. a couple of dB) of each other, then it is not clear which beacon the BLE enabled object is closer to. In that case, the previous location is used.

Figure 8:
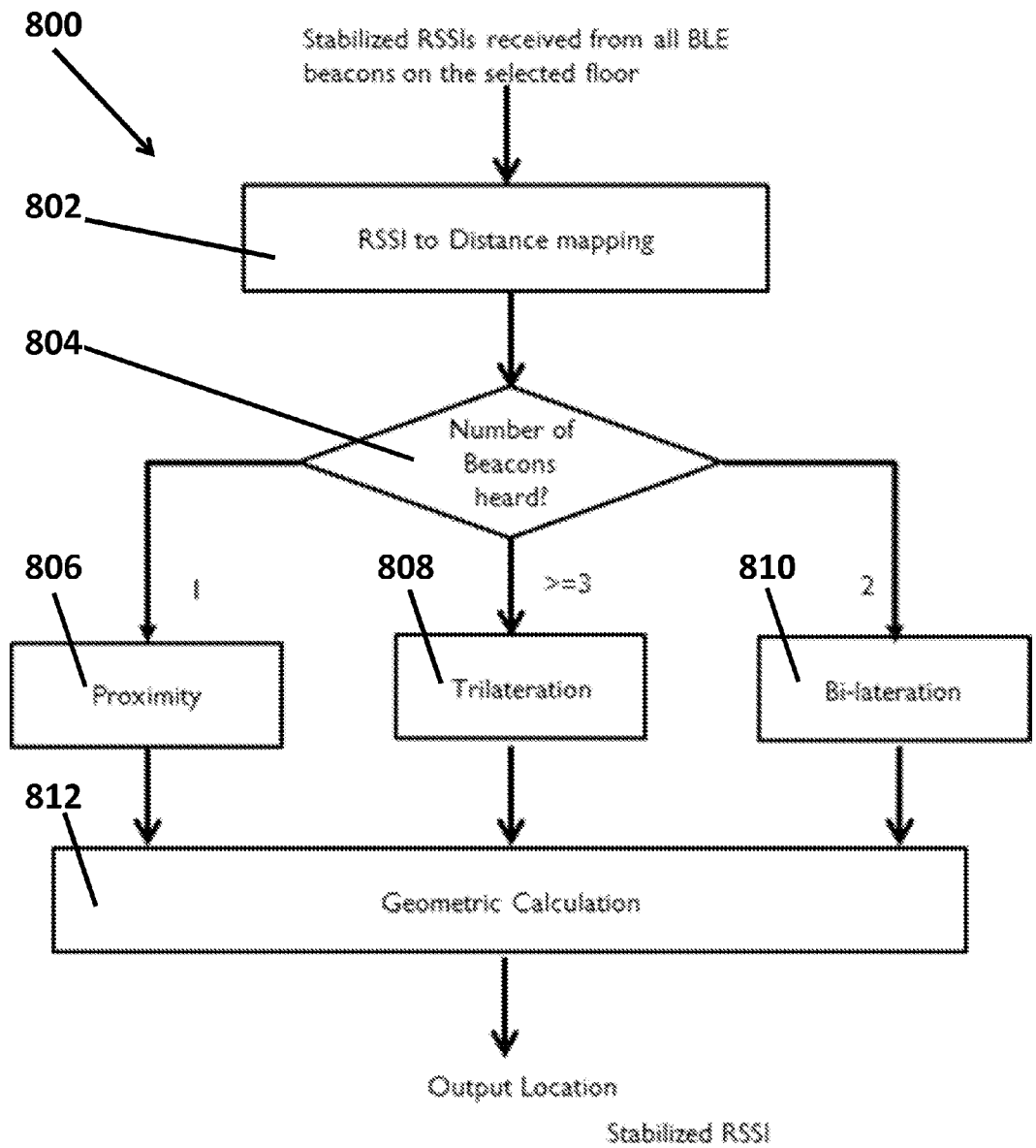
FIG. 8 illustrates an example a real time location service method that may be executed by the location engine.
Figure 9A:
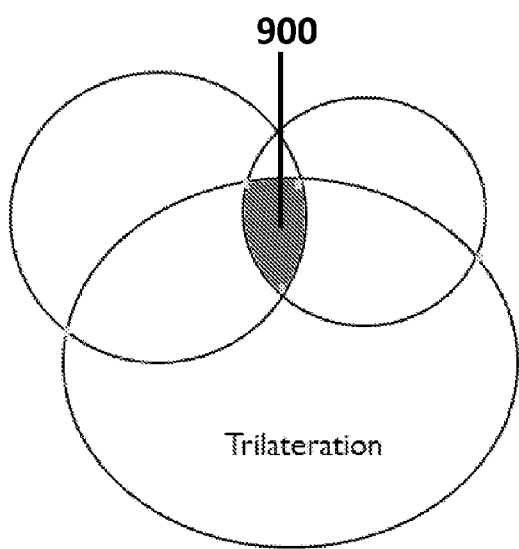
FIGS. 9A and 9B illustrate examples of a trilateration location process and a bilateration location process that may be executed by the location engine.
Figure 9B:
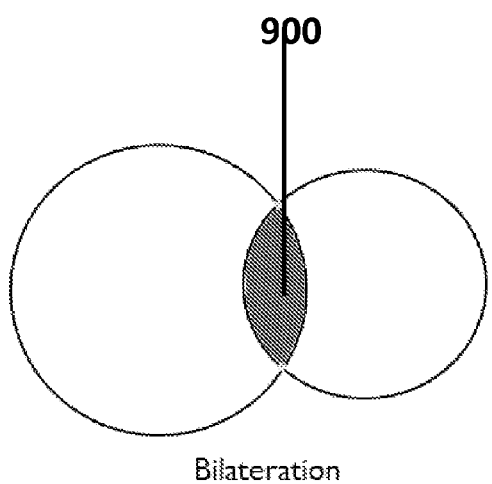

FIG. 8 illustrates an example a real time location service method 800 that may be executed by the location engine and FIGS. 9A and 9B illustrate examples of a trilateration location process and a bilateration location process that may be executed by the location engine. The RTLS method 800 is designed to locate a BLE enabled object such as an asset in an area within 30 seconds and 1-3 meter accuracy. In the method, the received signals from the beacons may be converted into estimated distance (802) based on beacon information (e.g. type of beacons, location of the beacons, environment). The techniques used to convert RSSI to distance include but not limited to path loss function, finger printing etc. The goal of the RSSI to distance conversion is to produce the optimal distance estimate given the received RSSI. Once the receiver distance from each beacon is estimated, a geometric calculation 804-812 may be performed to obtain the best location estimate. As shown, the method may determine the number of beacons heard by the BLE enabled object and use different methods to determine location. For example, if only one beacon signal is available, a proximity process 806 may be used to determine the location of the BLE enabled object. If two beacon signals are received by the BLE enabled object, a bilateration process 810 may be used and more than two beacon signals are received by the BLE enabled object, a trilateration process 808 may be used.

FIGS. 9A and 9B illustrate examples of Trilateration and Bilateration. Are area 900 represents the possible location estimate area. There are two steps in the process. The first step is to determine the most likely area (900) in which the BLE enabled object may be located. Then the second step is to determine a point inside the most likely area to produce a single location estimate. The techniques used to determine the best location estimate include but not limited to center of mass, boundary points, clustering algorithms such as DB scan, k-means, etc.

Figure 10:
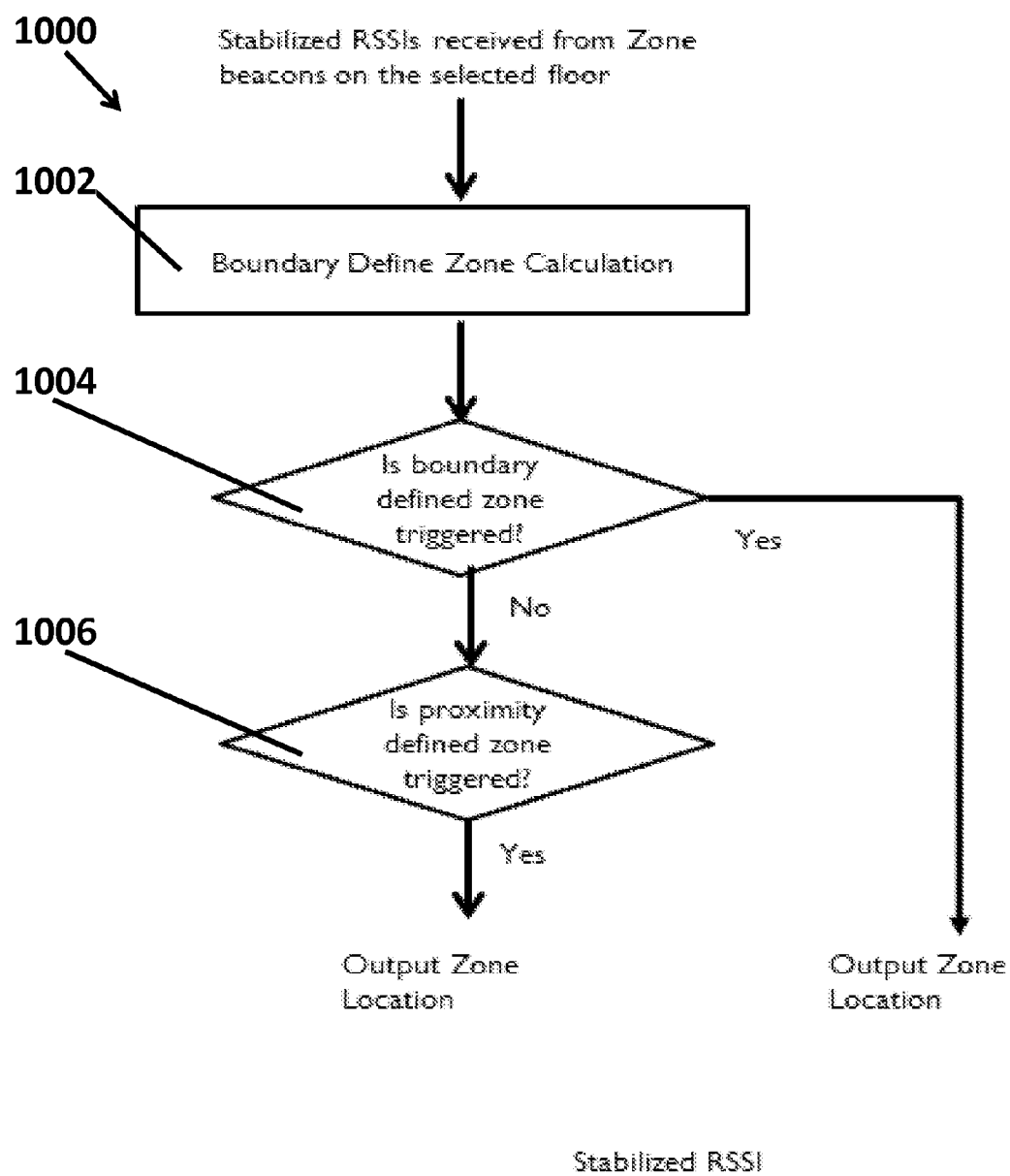
FIG. 10 illustrates an example a zone process that may be executed by the location engine.

FIG. 10 illustrates an example a zone process 1000 that may be executed by the location engine. The Zone method is designed to recognize whether a BLE enabled object is located in a zone location within a specific time period. These time periods may be typically much shorter than normal RTLS requirement. These zone locations are significant areas for the use case, typically include areas such as choke point, egress/exit, patient discharge, or linen chute. There are typically two types of zones: boundary and proximity defined. The proximity defined zone determination (1006) utilizes the omni or directional beacon to determine whether the location is inside the zone. The boundary defined zone determination (1004) may utilize boundary information defined by the directional beacons.

In the zone process described above, there are different ways to determine a zone. For example, one way is just like the bed/bay scenario, putting opposite directional beacons on the boundary to define the boundary. Once the boundaries are defined, the zone is defined. The second way to define zone is to use the omni-direction beacon and use the RSSI threshold to define the close area covered by the beacon. Therefore, the zone is defined in the zone process.

Figure 11:
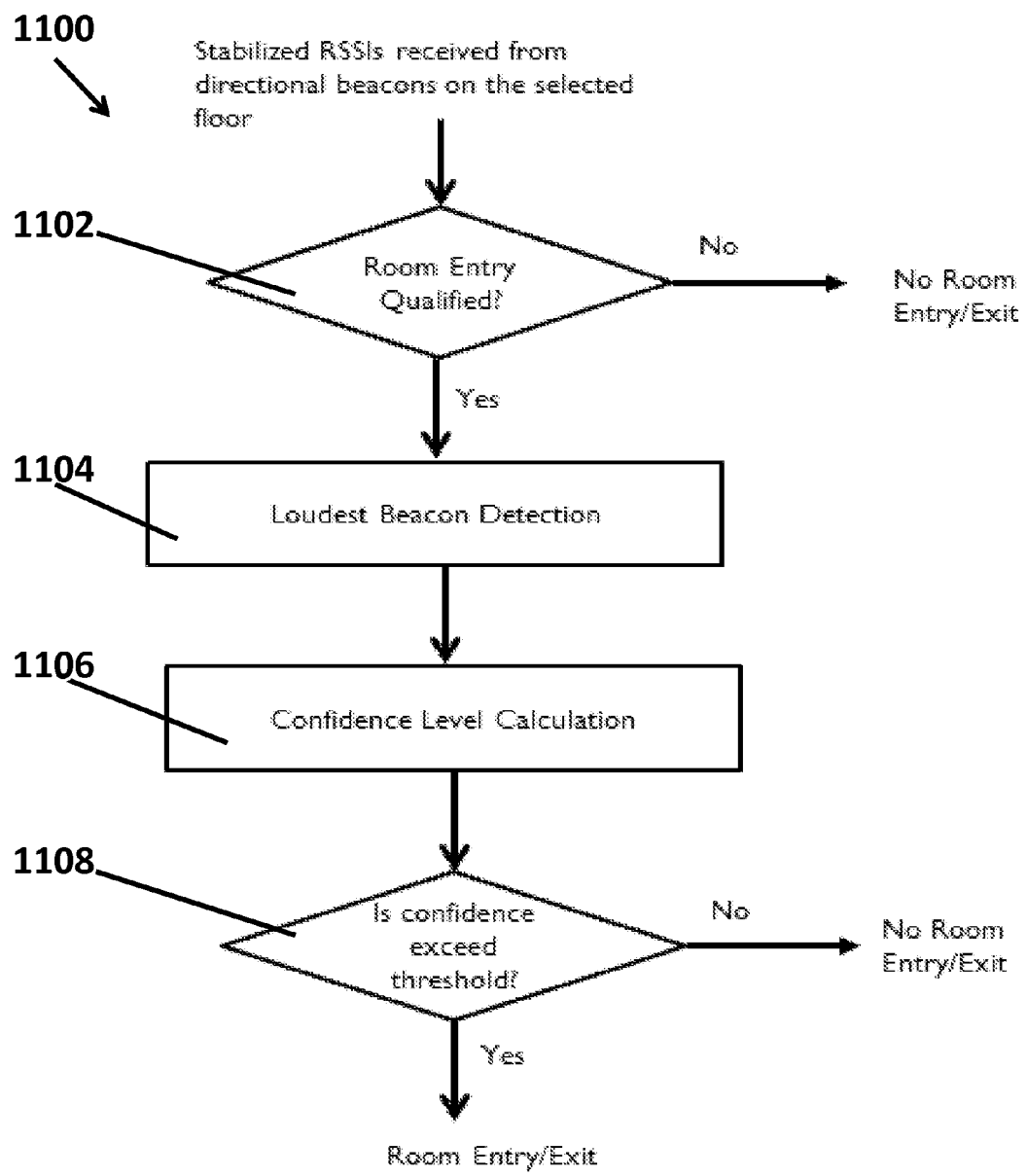
FIG. 11 illustrates an example of a room entry qualification process that may be executed by the location engine.

FIG. 11 illustrates an example of a room entry qualification process 1100 that may be executed by the location engine. The Fast Room Entry Algorithm is designed to detect staff and patient locations and their associated workflow as well as high accuracy asset tracking. The room entry and exit detection latency is typically sub 3 seconds with high accuracy (>=99%). The method performs a room entry qualification (1102) that calculates how probable the BLE enabled object is near the room boundary and is attempting a room boundary transition (enter/exit) as opposed to being located somewhere far away. For the probability, the process may use a first criteria that may be an RSSI strength between directional and omni-direction beacons. A second criteria may be hypothesis based and may determine if the received RSSIs match the pattern that the BLE enabled object is located in the RTLS area, or matches the pattern that the BLE enabled object is located in the fast room entry area?

If the criteria are met, the room entry calculation may be performed. Since the directional beacons are deployed along the boundaries of rooms, the loudest beacon is detected (1104) and represents the most likely area that the BLE enabled object is entering. The loudest beacon may be determined based on the signals received from the beacons by the BLE enabled object. However, the location transition only occurs when the confidence threshold is exceeded (1108). The confidence level calculation (1106) includes many factors. These factors include but not limited to differential signal strength of the loudest beacon with regard to the remaining beacons, is the beacon signal strength support the room boundary transition event, where the receiver was and if the transition is logical based on previous location and the current estimate with regard to the room/hallway layout etc. For example, if the loudest RSSI exceeds the second loudest RSSI by a predetermined margin of, for example a couple of dB, the threshold is met.

Figure 12:
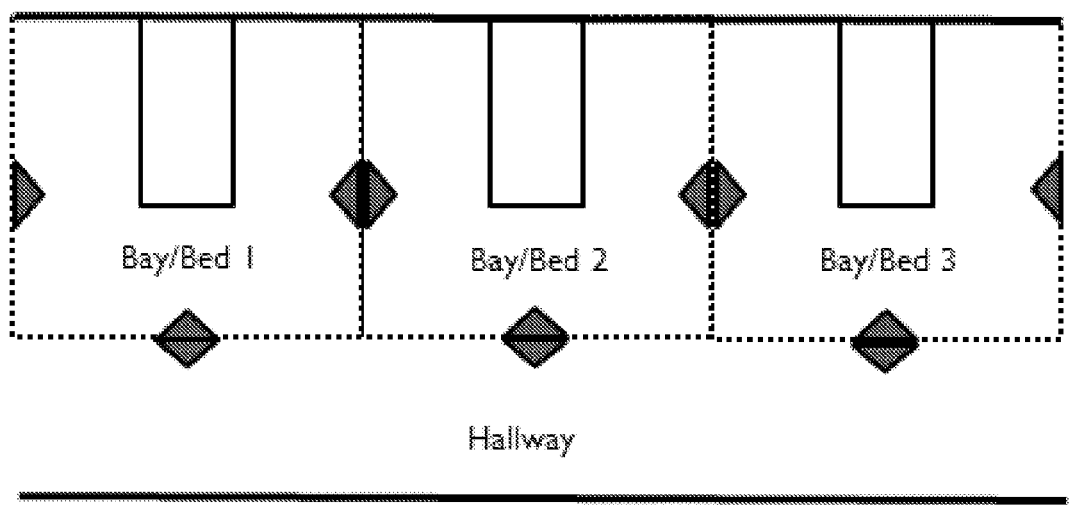
FIG. 12 illustrates a bay/bed layout in a building.
Figure 13:
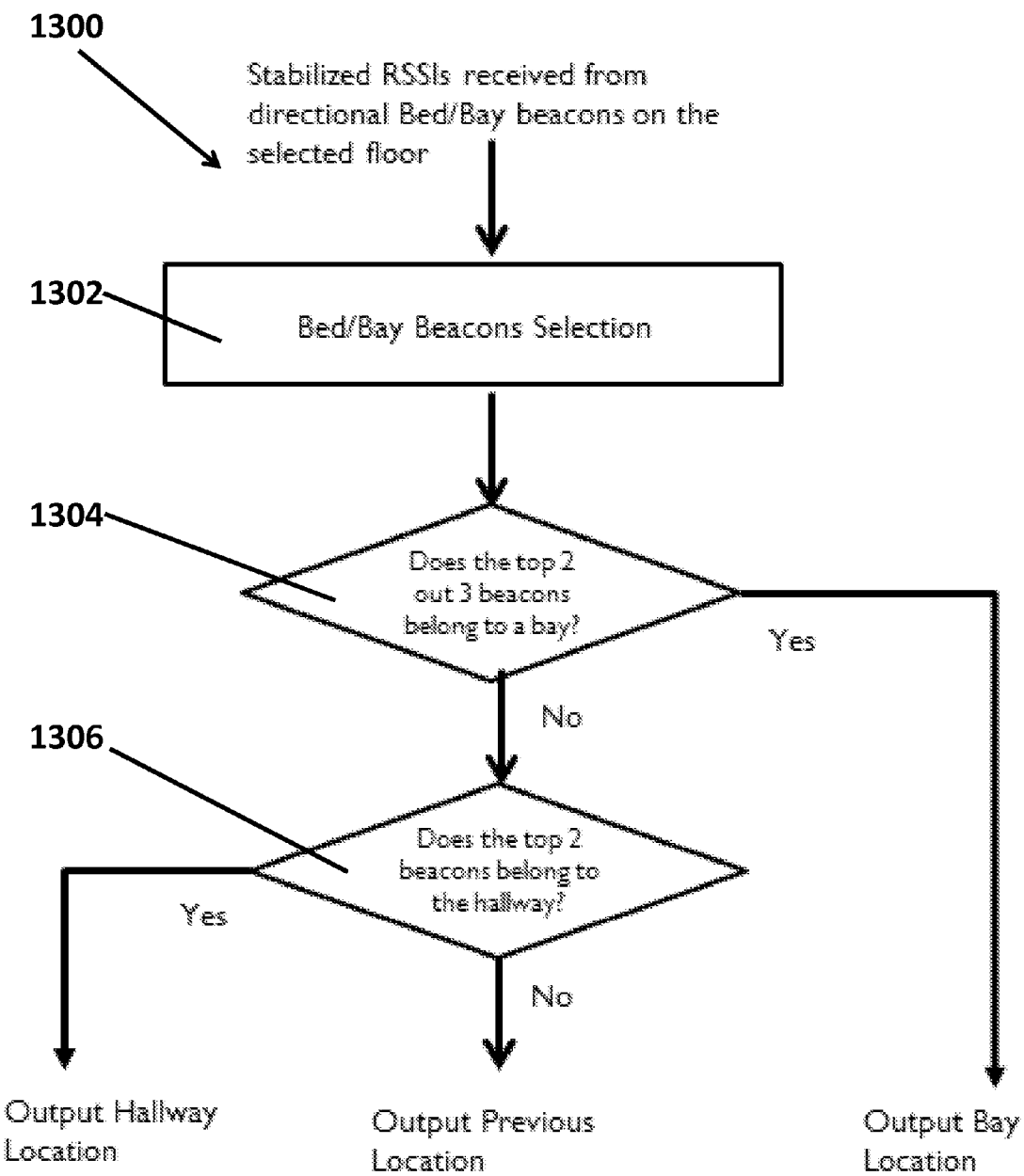
FIG. 13 illustrates an example of a bay/bed location method that may be executed by the location engine.

FIG. 12 illustrates a bay/bed layout in a building and FIG. 13 illustrates an example of a bay/bed location method 1300 that may be executed by the location engine. The Bed/Bay method is designed to detect asset, staff and patient locating in a sub room configuration. These sub room configurations include but not limited to scenarios such as multiple beds inside a patient room (e.g. double patient rooms), multiple beds inside a function area (e.g. Post-Anesthesia Care Unit (PACU)), multiple beds inside a hallway (e.g. hallway beds), multiple chairs inside a triage area. In these scenarios, there is no physical wall separating the beds and the areas surround the beds are typically small (e.g. 6-8 feet apart).

FIG. 12 shows a Bed/Bay Beacon Deployment Illustration. The directional beacons may be paired between beds/bays and hallway to create separation. The directional beacons are also required to create endcaps. Notice that for each bed/bay, there are 3 directional beacons used to create boundaries. The fourth boundary is wall in the illustration. However, in the case the fourth boundary is required (for example, back to back bed/bays sharing the wall), a paired beacons are required to define the fourth boundary. In this application, the directional beacons mounted on either side of each boundary having a weaker side of the radiated energy pattern due to the directional antenna pointed into the boundary area and the strong side of the radiated energy pattern due to the directional antenna pointed away from the boundary. The difference between the strong signal and the weak signal may be 20 dB that can be identified by the system.

In the method 1300, since there are 3 or 4 directional beacons pointing inward towards a bed/bay, the method requires the majority of the inside beacons (1302, 1304) to be in the top 3 strongest beacons in order to confirm the signal strength before the bed/bay location is confirmed. This is used to eliminate the impact of the noises from other surrounding beacons. For a hallway, the criterion is further tightened to minimize the bay/bed to hallway hopping. If the top two strongest beacons belong to the hallway (1306), then the method outputs the hallway location. For example, say B1-1, B1-2, B1-3 beacons are in bay 1; B2-1, B2-2, B2-3 beacons are in bay 2, and D, E are in hallway. If the loudest 3 beacons are B1-1, B2-1, B1-3, then the Bay 1 is the location. If the loudest 2 beacons are D, E, then hallway is the location.

Figure 14:
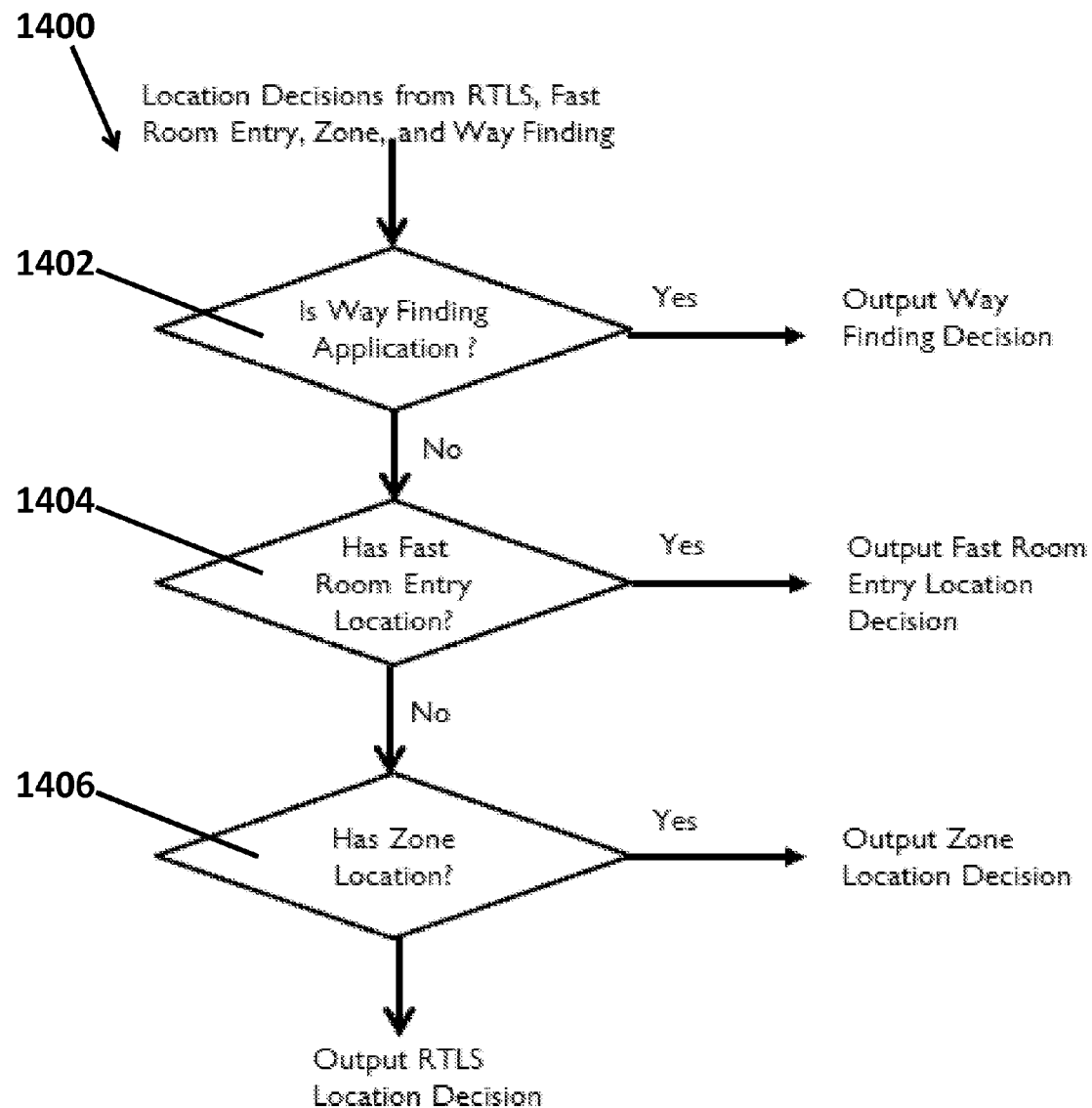
FIG. 14 illustrates an example of an arbitration and switching process that may be executed by the location engine.

FIG. 14 illustrates an example of an arbitration and switching process 1400 that may be executed by the location engine. The Arbitration and Switching method is designed to provide a single location output in the event the four CORE location methods outputting different location outputs. For example, when both RTLS and Fast Room Entry give out location but the locations are different, the location method should determine and have a single location output. This is particular import on an enterprise wide deployment with multiple intended applications.

In the method, there can be a pre-defined sequence to decide what location output to use (1402-1406). However, it can also be dynamic and based on the confidence level of each algorithm to select the final output. For example, the dynamic approach may have each location method output a location and a confidence level (say from 0-100%). Then instead of going through the predefined arbitration process, the arbitration could just pick the location with the highest confidence level.

Figure 15:
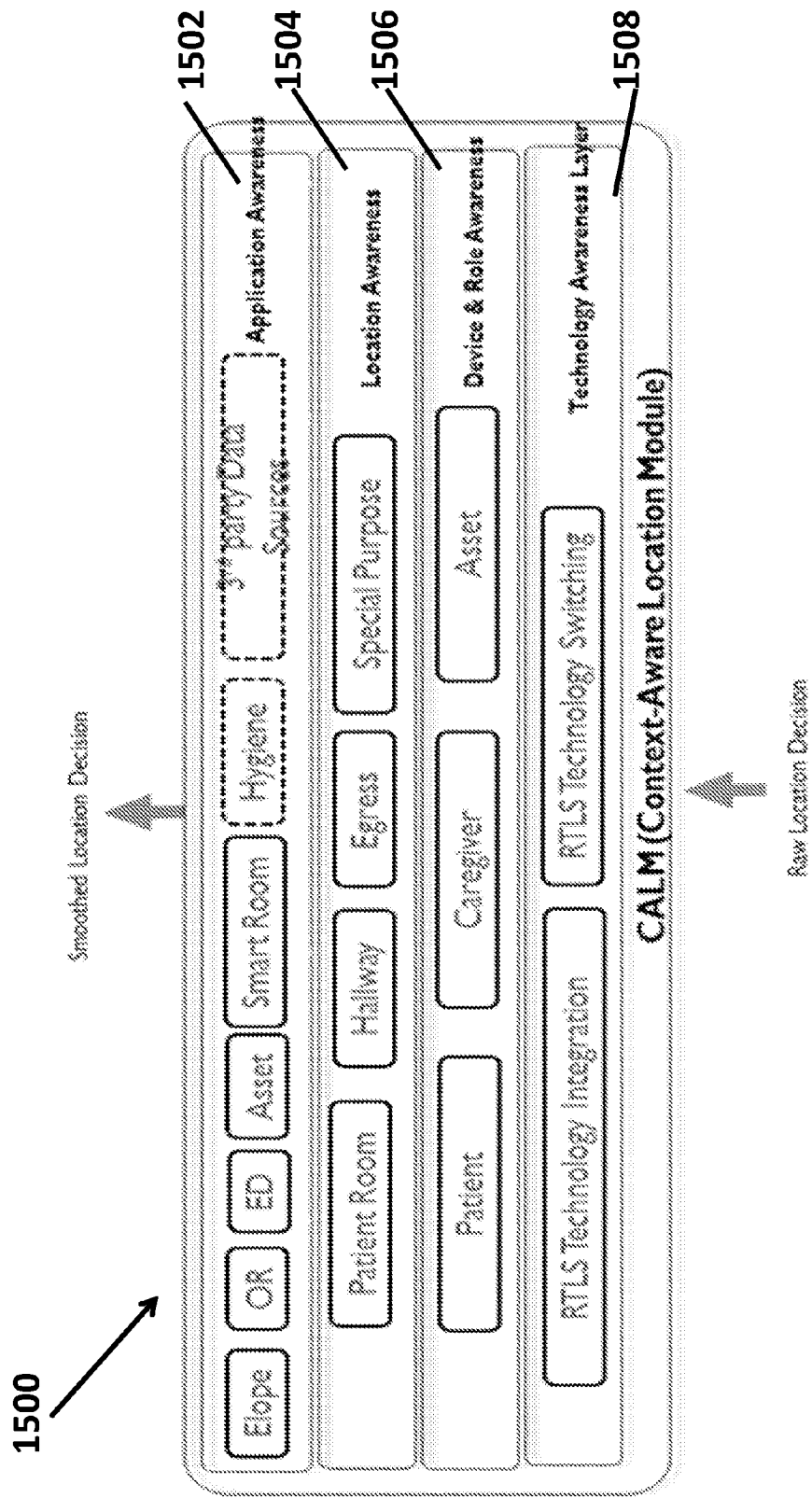
FIG. 15 illustrates an example of a context-aware module that may be part of the location engine.

FIG. 15 illustrates an example of a context-aware module 1500 that may be part of the location engine. The Context-Aware Location Module (CALM) is designed to utilize Context information to enhance the location output and minimize the location errors such as room hopping. It also includes logics to produce varies degree of smoothing of the input raw locations based on use cases to enhance the response time. The context information CALM utilizes include but not limited to application, location, device, and technology information.

The RTLS Technology integration could include for example BLE, ZigBee, and WIFI location decisions from different hardware inputs. The location and role awareness module include multiple techniques to prevent certain location transition errors from occurring. For example, preventing the room to room location transition that did not go through a connecting hallway; Most likely location change sequence within a hospital care unit such as Unit Entry to hallway to room. The sequence might be different based on the role of the receiver. CALM is also application aware and is taking inputs from the applications. For example, in the ED/OR application, the caregiver pre-assign a patient to a room. In the case, the CALM will utilize the patient-room assignment information to enhance the location results.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A location engine for location determination, comprising:
   a processor and a memory;
   a floor selection process executed by the processor that receives one or more signals of one or more Bluetooth Low Energy (BLE) beacons received by a BLE enabled object and determines a floor location of the BLE enabled object;
   a location process executed by the processor that receives the one or more BLE beacon signals and determines one or more locations of the BLE enabled object in response to the determined floor location of the BLE enabled object using a plurality of different location determining processes,
   and wherein the location process uses a zone process to determine the location of the BLE enabled object using the one or more BLE beacon signals when the BLE enabled object determined floor location is a significant area of use,
   uses a rapid room entry process to determine the location of the BLE enabled object using the one or more BLE beacon signals when the BLE enabled object is in the determined floor location and crosses a boundary,
   and uses a bed/bay location process to determine the location of the BLE enabled object using the one or more BLE beacon signals when the BLE enabled object determined floor location is in a sub room location;
   and wherein the location process automatically selects an output location result from the one or more determined locations of the BLE enabled object.

2. The engine of claim 1 further comprising a context-aware location component that minimizes a location error of the output location result.

3. The engine of claim 1, wherein the location process uses a way finder process to determine the location of the BLE enabled object using the one or more BLE beacon signals when navigating inside and outside a building.

4. The engine of claim 3, wherein the way finder process detects a proximity of the BLE enabled object to one of the one or more BLE beacons, determines a proximity confidence and outputs a location results when the proximity confidence exceeds a threshold.

5. The engine of claim 1, wherein the rapid room entry process detects a loudest BLE beacon, determines a confidence level that the BLE enabled object crossed the boundary based on the detected loudest BLE beacon and outputs a location results when the confidence level exceeds a threshold.

6. The engine of claim 1, wherein the sub room location in one of a particular bed and a bay in the determined floor location.

7. The engine of claim 6, wherein the location process uses a real-time location system (RTLS) process to determine the location of the BLE enabled object using the one or more BLE beacon signals when a designated requirement for the location of the BLE enabled object exists.

8. A method for determining location, comprising:
receiving one or more signals from one or more Bluetooth Low Energy (BLE) beacons by a BLE enabled object;
determining a floor location of the BLE enabled object using the one or more BLE beacon signals;
determining one or more locations of BLE enabled object in response to the determined floor location of the BLE enabled object using a plurality of different location determining processes; and
wherein determining the location further comprises using a real-time location system (RTLS) process to determine the location of the BLE enabled object using the one or more BLE beacon signals when a designated requirement for the location of the BLE enabled object exists, using a zone process to determine the location of the BLE enabled object using the one or more BLE beacon signals when the determined floor location of the BLE enabled object is a significant area of use, using a fast room entry process to determine the location of the BLE enabled object using the one or more BLE beacon signals when the BLE enabled object is in the determined floor location and crosses a room boundary and using a bed/bay location process to determine the location of the BLE enabled object using the one or more BLE beacon signals when the BLE enabled object determined floor location is in a sub room location; and
wherein the location process automatically selects an output location result from the one or more determined locations of the BLE enabled object.

9. The method of claim 8, wherein determining the location further comprises using a way finding process to determine the location of the BLE enabled object using the one or more BLE beacon signals when navigating inside and outside a building.

10. The method of claim 8 further comprising minimizing a location error of the output location result.

11. The method of claim 9, wherein the way finder process detects a proximity of the BLE enabled object to one of the one or more BLE beacons, determines a proximity confidence and outputs a location results when the proximity confidence exceeds a threshold.

12. The method of claim 8, wherein using the rapid room entry process further comprises detecting a loudest BLE beacon, determining a confidence level that the BLE enabled object crossed the boundary based on the detected loudest BLE beacon and outputting a location results when the confidence level exceeds a threshold.

13. The method of claim 8, wherein the sub room location in one of a particular bed and a bay in the determined floor location.

14. A system, comprising:
one or more Bluetooth Low Energy (BLE) beacons that are fixed within a three dimensional space;
a BLE enabled object having a BLE receiver to receive a signal from at least one BLE beacon; and
a location engine having a processor that is configured to receive the at least one signal from the BLE beacon received by the BLE enabled object and determine one or more locations of the BLE enabled object using a plurality of different location determining processes by selecting, based on the at least one signal from the BLE beacon, a zone process to determine the location of the BLE enabled object using the one or more BLE beacon signals when the BLE enabled object is located in a significant area of use, a fast room entry process to determine the location of the BLE enabled object using the one or more BLE beacon signals when the BLE enabled object crosses a room boundary and a bed/bay location process to determine the location of the BLE enabled object using the one or more BLE beacon signals when the BLE enabled object is in a sub room location, and automatically selecting an output location result from the one or more determined locations of the BLE enabled object.

15. The system of claim 14 further comprising a context-aware location component that minimizes a location error of the output location result.

16. The system of claim 14, wherein the location engine uses a way finder process to determine the location of the BLE enabled object using the one or more BLE beacon signals when navigating inside and outside a building.

17. The system of claim 16, wherein the way finder process detects a proximity of the BLE enabled object to one of the one or more BLE beacons, determines a proximity confidence and outputs a location results when the proximity confidence exceeds a threshold.

18. The system of claim 15 wherein the rapid room entry process detects a loudest BLE beacon, determines a confidence level that the BLE enabled object crossed the boundary based on the detected loudest BLE beacon and outputs a location results when the confidence level exceeds a threshold.

19. The system of claim 14, wherein the sub room location in one of a particular bed and a bay in the determined floor location.

20. The system of claim 14, wherein the location engine uses a real-time location system (RTLS) process to determine the location of the BLE enabled object using the one or more BLE beacon signals when a designated requirement for the location of the BLE enabled object exists.

\* \* \* \* \*